United States Patent
Whitaker

[15] 3,662,445
[45] May 16, 1972

[54] LATHE TOOLS

[72] Inventor: Derek Whitaker, 6/60 George Street, Marrickville, New South Wales, 2204, Australia

[22] Filed: Sept. 15, 1970

[21] Appl. No.: 72,337

[30] Foreign Application Priority Data

Oct. 20, 1969  Australia ............................62578/69

[52] U.S. Cl................................................29/97, 29/96
[51] Int. Cl................................................B26d 1/00
[58] Field of Search..................29/96, 97, 98, 105, 105 A

[56] References Cited

UNITED STATES PATENTS

| | | | |
|---|---|---|---|
| 1,104,980 | 7/1914 | Fry | 29/98 |
| 3,534,457 | 10/1970 | Mueller | 29/96 |
| 3,551,977 | 1/1971 | Novkov | 29/96 |
| 1,380,744 | 6/1921 | Simmons | 29/96 |
| 1,776,335 | 9/1930 | Rauzieres | 29/96 |
| 2,737,705 | 3/1956 | Novkov | 29/96 |
| 2,940,160 | 6/1960 | Novkov | 29/97 |
| 3,316,617 | 5/1967 | Stein | 29/97 |

FOREIGN PATENTS OR APPLICATIONS 810,512  3/1959  Great Britain............................29/97

*Primary Examiner*—Harrison L. Hinson
*Attorney*—Holcombe, Wetherill & Brisebois

[57] ABSTRACT

A parting off tool has a cutting tip which is clamped between a lower blade member and the front of an upper clamping member. The clamping is effected by rotating the clamping member about a pivot point using a screw adjustment made on the rearward part of the clamping member, the blade member being held stationary. The cutting tip is adjustable using a pusher rod bearing against the rear face of the tip. A chamfer cutting blade can be mounted alongside the blade member so that the same tool can be used both for parting off and also for putting a chamfer on the workpiece left in a lathe. The combined operation can be performed simultaneously in some instances.

3 Claims, 4 Drawing Figures

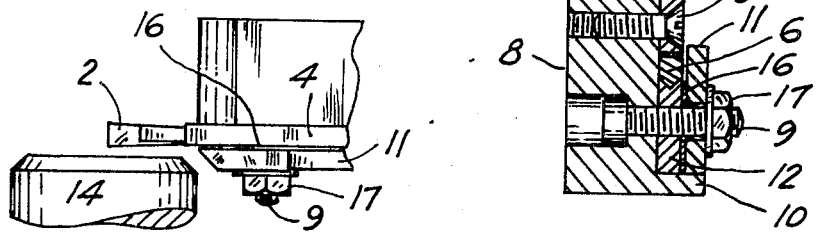
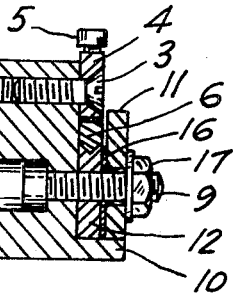
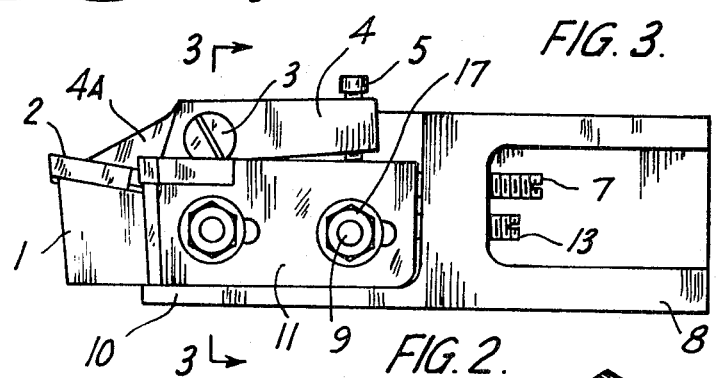
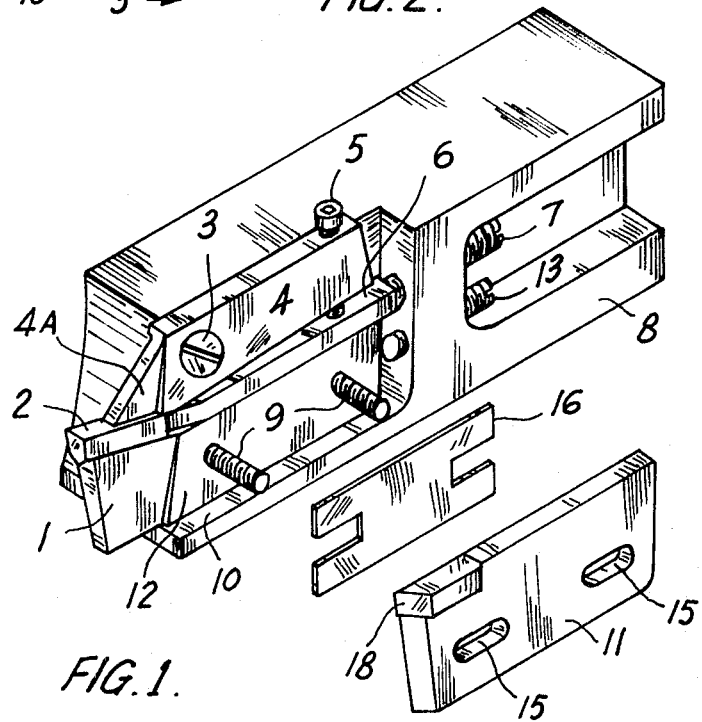

LATHE TOOLS

This invention relates to lathe tools and more particularly to parting off and chamfer tools used with, inter alia, metal working lathes.

Parting off tools having a hardened cutting tip clamped between two members are known. None of these known tools, however, has provision for the addition of a chamfer tool thereto. Many have ineffective clamping and/or insufficient support for the clamping members to enable them to be used with confidence for accurate work (where a swage of cut material must not, if it wedges between the work and a clamping member, cause the clamping member to move even slightly) and some can only be used for parting off pipes or small diameter rods. The usual combination parting off and chamfer tool is made by grinding a section of tool material from a blade and incorporating a 45° chamfer at the junction between the thin and original blade sections. This practice is wasteful, time consuming and provides a combination tool with limited scope for its use.

It is an object of the present invention to provide a parting off tool that is easy and reliable to use and has a replaceable, adjustable cutting tip.

It is a further object of the present invention to provide a novel combination parting off and chamfer tool.

According to the present invention, a parting off tool comprises a tool body against which is located a blade member, a clamping member being disposed above said blade member, said clamping member being pivoted about a pivot attached to said tool body and clamping a cutting tip between said blade member and said clamping member, the clamping force being provided by a clamp screw passing through a tapped hole in said clamping member and bearing against a surface, whereby screwing said clamp screw further into said hole lifts one end of said clamping member which pivots about said pivot to move the other end into engagement with said cutting tip, the bottom of said cutting tip being shaped to fit into a groove formed in the tip surface of said blade member and thus prevent sideways displacement of said tip relative to said blade member.

Also in accordance with the present invention, a combined parting off and chamfer tool comprises a parting off tool as described in the preceding paragraph, in which said blade member is held in position relative to said body by means of a screw and nut arrangement, the screw or screws thereof passing through said blade member and a chamfer blade having a chamfer cutting member brazed into a top corner thereof located alongside said blade member with said chamfer cutting member substantially on a level with said cutting tip, said nut and screw arrangement holding said chamfer blade, blade member and tool body in fixed relationship to each other.

Preferred embodiments of the present invention will now be described with reference to the accompanying drawings, in which:

FIG. 1 is an exploded isometric view showing the various components of a combined parting off and chamfer tool, FIG. 2 is side elevation of the assembled tool of FIG. 1, FIG. 3 is section through line 3—3 of FIG. 2, and FIG. 4 is a top view of the front end of the tool illustrating how it is used with a workpiece.

A tool body 8 is constructed from a single mass of metal, preferably steel, with a ledge 10 formed therein, upon which rests a blade member 12 which is provided with two clearance holes for screws 9. Screws 9 are anchored to the tool body 8, being inserted through tapped apertures extending through the same. Alternatively, screws 9 are studs anchored to the tool body.

The foremost section 1 of blade member 12 is shaped to carry a cutting tip 2 on the top thereof. A groove, typically V-shaped, is provided in the top surface of section 1 into which the complementary surface of the bottom of tip 2 fits, this arrangement preventing sideways movement of tip 2 relative to section 1 when the former is clamped to the latter.

The clamping of tip 2 is effected by a clamping member 4 pivoted about a pivot 3 which is typically in the form of a screw into the tool body, in which form it acts to constrain the clamping member 4 against sideways movement away from the tool body. Clamping screw 5 is carried in a threaded hole passing through clamping member 4 and, in the embodiment illustrated, bears against the top surface of tip pusher 6, which will be described later. If the clamping member were thicker than that shown in the drawings, clamping screw 5 could be set further away from the outer edge so that it bears against a second ledge formed in the tool body. This, however, involves additional working of the tool body and although an alternative, is not preferred. Screwing clamping screw 5 further into its threaded hole causes clamping member 4 to pivot about pivot 3 and clamping portion 4A to bear against the top of tip 2. The top of tip 2 and the bottom surface of portion 4A may be shaped in a similar manner to the top of section 1 of the blade member and the bottom of tip 2.

The amount by which the end of tip 2 projects beyond the foremost section 1 of blade member 12 is variable. Release of the clamping of the tip by withdrawing screw 5 permits tip 2 to be moved to a fresh position relative to the blade and clamp members, following which it can be re-clamped in position.

For use in the re-positioning of tip 2, a tip pusher 6 is provided in the preferred embodiments of the invention. The tip pusher 6 in the illustrated embodiment has a V-shaped bottom surface which sits in a V-shaped groove in the top surface of blade 1. The tip pusher has an upturned end to bear against tip 2 when the latter is in various positions on the foremost section 1 of blade 12, for, as will be well known to those skilled in this art, tip 2 is preferably inclined to the horizontal when mounted in a lathe tool. The position of tip pusher 6 is controlled by pusher screw 7, which also acts as a stop to prevent rearward movement of the tip and tip pusher when the tool is in use. This is a safety feature, of course, for if the tip has been properly clamped, no rearward movement of it should be possible.

An alternative construction of the tip pusher is to machine a spline knurl on its V-shaped bottom surface which mates with a matching spline knurl on the groove in blade member 12. Tightening clamping screw 5 locks the knurls together preventing relative movement between tip pusher 6 and blade member 12. A pusher screw 7 is not required for this embodiment, the setting of the tip 2 being effected by hand (as in the case of embodiments not including a tip pusher).

When the tool is to be used purely for parting off, nuts 17 (with suitable washers, of course) hold the tool in its correctly assembled form. In use, a tip 2 is inserted into the tool which is used until the tip is blunt. The tip is then quickly and easily withdrawn for sharpening, then re-inserted, equally rapidly and easily, for continued use, the tip pusher being used to re-set the tip relative to the blade member 12 to take into account the shortening of the tip due to sharpening. Those persons who use such a tool continuously in their work will provide themselves with a number of tips — sharpened at the cutting end — which will be used in turn, sharpening being carried out only when all tips are blunt or when a suitable opportunity arises before total blunting.

When a workpiece has had its end parted off, it is often the case that the next tool to be used in its machining prefers to start on a chamfered edge rather than a sharp one. For use in such cases, a chamfer blade has been designed for attachment to the parting off tool of the present invention so that a single tool can perform both parting off and chamfering the workpiece.

A chamfer blade for attachment to the present invention to provide a combination tool is a steel (or other suitable metal) plate 11 having slots 15 formed therein and a chamfer tip 18 brazed to its top, foremost corner. The chamfer blade is placed alongside blade member 12 with screws or studs 9 passing through slots 15 and the bottom of plate 11 resting on ledge 10. Nuts 17 are used to hold the tool so assembled. A shim 16 is preferably included between blade 12 and plate 11 where there is any possibility that the positioning of the chamfer blade will prevent easy adjustment of the tip 2 by bearing against the tip, clamping member 4 or tip pusher 6.

Movement of the chamfer blade forward or backwards is achieved by slackening nuts 17, adjusting the position of chamfer pusher screw 13 (which acts in the same way as tip pusher screw 7) and plate 11 within the limits defined by slots 15, then re-tightening nuts 17. Reference to FIG. 4 shows how the combination tool shapes the end of a workpiece 14, the chamfer and parting off being effected simultaneously with workpieces of a larger cross-section.

It is not necessary to form a recess in the rear part of the tool body to expose screws 7 and 13, as shown in the drawings; a clearance hole for screwdriver access to them is sufficient and requires less working of the tool body.

I claim:

1. A parting off tool comprising a tool body against which is located a blade member and a clamping member disposed above said blade member, said clamping member being pivoted about a pivot attached to said tool body and clamping a cutting tip between said blade member and said clamping member, the clamping force being provided by a clamp screw passing through a threaded hole in said clamping member and bearing against a surface, whereby screwing said clamp screw into said hole lifts one end of said clamping member which pivots about said pivot to move the other end thereof into engagement with said cutting tip, the bottom of said cutting tip being shaped to fit into a groove formed in the top surface of said blade member to prevent sideways displacement of said tip relative to said blade member, said tip pusher being located behind said cutting tip between said clamping member and said blade member, and being adjustable in position to control the setting of said cutting tip in said tool, said blade member being held in position relative to said tool body by a screw and nut arrangement, the screws of which pass through said blade member and also through a chamfer blade having a chamfer cutting member mounted in a top corner thereof, said chamfer blade being located alongside said blade member with said chamfer cutting member substantially on a level with said cutting tip, the nuts of said arrangement holding said chamfer blade, blade member and tool body in fixed relationship to each other.

2. A combination tool according to claim 1, in which said screws pass through horizontal slots in said chamfer blade whereby fore and aft adjustment of the position of said chamfer blade relative to said blade member is permitted.

3. A combination tool according to claim 1, in which a chamfer blade pusher screw is mounted in adjustable relationship on said tool body to bear against the rearmost end of said chamfer blade to assist in effecting said fore and aft adjustment thereof.

* * * * *